(12) United States Patent
Drennen et al.

(10) Patent No.: US 9,221,440 B2
(45) Date of Patent: Dec. 29, 2015

(54) ELECTROMECHANICAL ACTUATOR STRAIN GAUGE TEMPERATURE COMPENSATION DEVICE

(71) Applicant: GOODRICH CORPORATION, Charlotte, NC (US)

(72) Inventors: David Drennen, Bellbrook, OH (US); Steven Keller, Union, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 78 days.

(21) Appl. No.: 14/074,464

(22) Filed: Nov. 7, 2013

(65) Prior Publication Data

US 2015/0127233 A1 May 7, 2015

(51) Int. Cl.
| | |
|---|---|
| G06F 7/70 | (2006.01) |
| B60T 8/172 | (2006.01) |
| B60T 8/17 | (2006.01) |
| F16D 65/18 | (2006.01) |
| F16D 66/00 | (2006.01) |
| G01L 5/00 | (2006.01) |
| H02K 11/00 | (2006.01) |

(52) U.S. Cl.
CPC ............... *B60T 8/172* (2013.01); *B60T 8/1703* (2013.01); *F16D 65/18* (2013.01); *F16D 66/00* (2013.01); *G01L 5/0061* (2013.01); *H02K 11/001* (2013.01); *F16D 2066/001* (2013.01); *F16D 2066/005* (2013.01)

(58) Field of Classification Search
None
See application file for complete search history.

(56) References Cited

U.S. PATENT DOCUMENTS

2002/0134794 A1* 9/2002 McManus et al. ............... 222/55
2004/0159776 A1* 8/2004 Richard et al. ............ 250/214 R

FOREIGN PATENT DOCUMENTS

| DE | 10307978 | 9/2004 |
| JP | 2010270788 | 12/2010 |
| WO | 2011039567 | 4/2011 |

OTHER PUBLICATIONS

Extended European Search Report dated Aug. 12, 2015 in European Application No. 14191333.5.

* cited by examiner

*Primary Examiner* — Adam Alharbi
(74) *Attorney, Agent, or Firm* — Snell & Wilmer, LLP

(57) ABSTRACT

The EMA may comprise an EMA housing, a strain gauge coupled to the EMA housing, the strain gauge comprising a Wheatstone bridge, the Wheatstone bridge comprising a first group of resistors coupled in parallel with a second group of resistors, a controller coupled to the strain gauge, a variable resistance resistor coupled to the Wheatstone bridge, the variable resistance resistor configured to derive a temperature of the EMA housing based upon a temperature of the variable resistance resistor and configured to provide feedback to the controller, the controller adjusting a force applied by the EMA based upon the temperature of the EMA housing.

11 Claims, 5 Drawing Sheets

ELECTROMECHANICAL ACTUATOR STRAIN GAUGE TEMPERATURE COMPENSATION DEVICE

FIELD

The present disclosure relates to electromechanical actuators ("EMAs"), and more particularly, to temperature compensation devices for EMAs.

BACKGROUND

EMAs are braking assemblies that forcefully move a translating member (a "ball nut") against a brake disk stack to generate a braking force. This braking force drives the ball nut into forceful engagement with the brake disk stack to generate a braking force.

SUMMARY

The EMA may comprise an EMA housing, a strain gauge coupled to the EMA housing, the strain gauge comprising a Wheatstone bridge, the Wheatstone bridge comprising a first group of resistors coupled in parallel with a second group of resistors, a controller coupled to the strain gauge, a variable resistance resistor coupled to the Wheatstone bridge, the variable resistance resistor configured to derive a temperature of the EMA housing based upon a temperature of the variable resistance resistor and configured to provide feedback to the controller, the controller adjusting a force applied by the EMA based upon the temperature of the EMA housing. The controller may be configured to measure a resistance of the variable resistance resistor to obtain a temperature of the EMA housing. The variable resistance resistor may be coupled in series with the Wheatstone bridge. One resistor of the first group of resistors or the second group of the resistors in the Wheatstone bridge may be strain sensitive, the resistance of the one resistor thereof varying with the load measured by the Wheatstone bridge. Each resistor of the first group of resistors or the second group of the resistors in the Wheatstone bridge may comprise a known resistance. The controller may tabulate a plurality of loads based upon a plurality of temperatures measured by the variable resistance resistor. The controller may tabulate a plurality of resistances based upon the plurality of temperatures measured by the variable resistance resistor. The controller may adjust the force applied by the EMA based upon each of a tabulated plurality of resistances.

The EMA may comprise a controller coupled to a strain gauge, the strain gauge comprising a Wheatstone bridge and a variable resistance resistor coupled in series with the Wheatstone bridge, wherein the controller adjusts a force applied by the EMA based upon a resistance of the variable resistance resistor. The Wheatstone bridge may comprise a first group of resistors coupled in parallel with a second group of resistors. The controller may determine a temperature of the EMA based upon the resistance of the variable resistance resistor. The controller may adjust a force applied by the EMA based upon the resistance of the variable resistance resistor. The variable resistance resistor may be coupled in series with the Wheatstone bridge. The resistance of the variable resistance resistor may be affected by a temperature of the variable resistance resistor. Each resistor of the first group of resistors and the second group of resistors in the Wheatstone bridge may comprise a known resistance.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

An EMA may extend along the axis defined by the centerline marked A-A'. The portion near A may be referred to as proximal and the portion near A' may be referred to as distal. In that regard, A is proximal to A' and A' is distal to A. An EMA may extend radially outward from the centerline A-A'.

Figure 1:
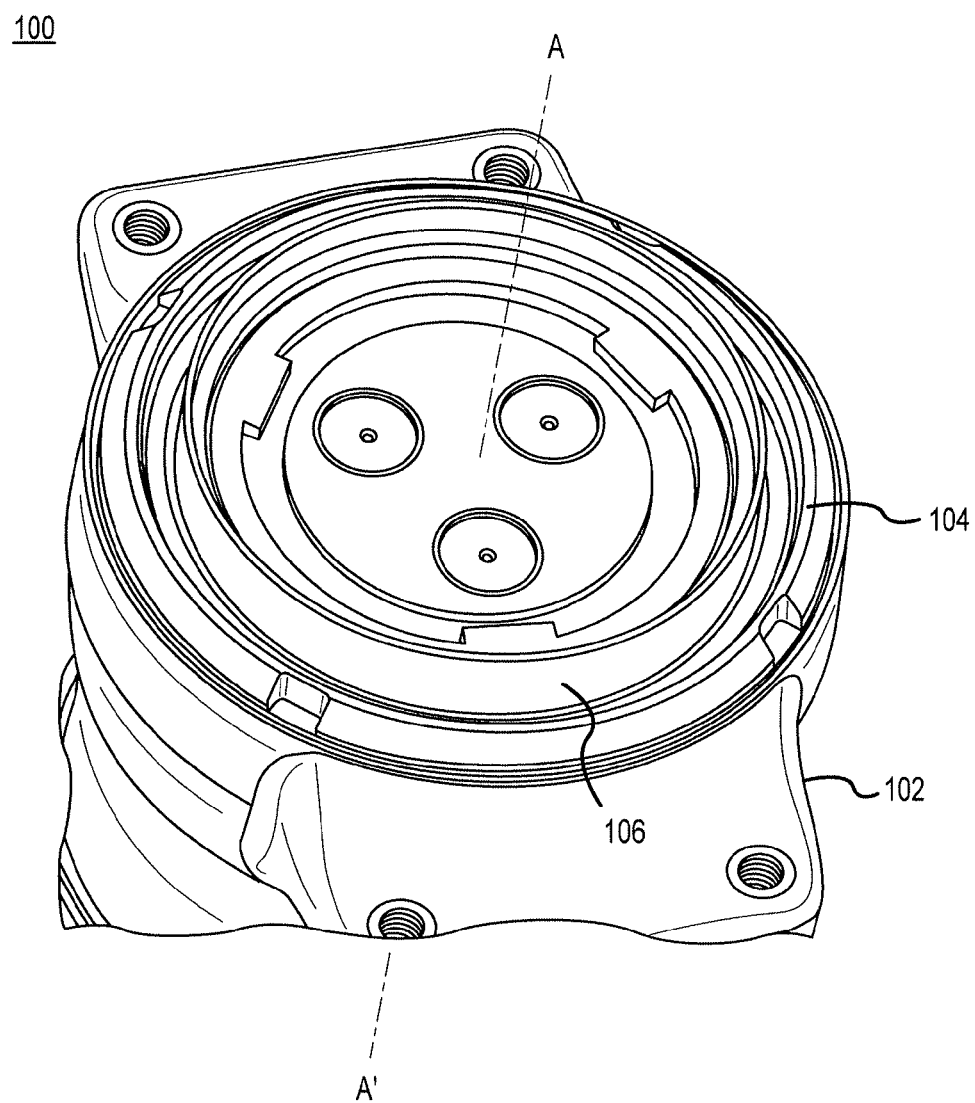
FIG. 1 illustrates, in accordance with various embodiments, a perspective view of an EMA.

With reference to FIG. 1, a perspective view of an EMA 100 is shown. The EMA may extend along the axis marked A-A'. The EMA 100 may, as described above, apply a braking force to an aircraft wheel. To this end, the EMA 100 assembly may comprise an EMA housing 102, which may extend along the axis A-A'. The EMA housing 102 may house a variety of components, including, for example, a ball nut 104, a ball screw 106, and a motor drive unit. Generally, the motor drive unit may drive the ball screw 106 through a plurality of rotations about the axis A-A'. As the ball screw 106 rotates, the ball nut 104 may translate distally and/or proximally along the axis A-A' (depending upon the direction of rotation of the ball screw 106). The ball nut 104 may be coupled to a disc or "puck," at a distal end thereof. The puck may exert a pressure against a brake stack coupled to an aircraft wheel to impede or halt a rolling motion of the wheel.

Figure 2:
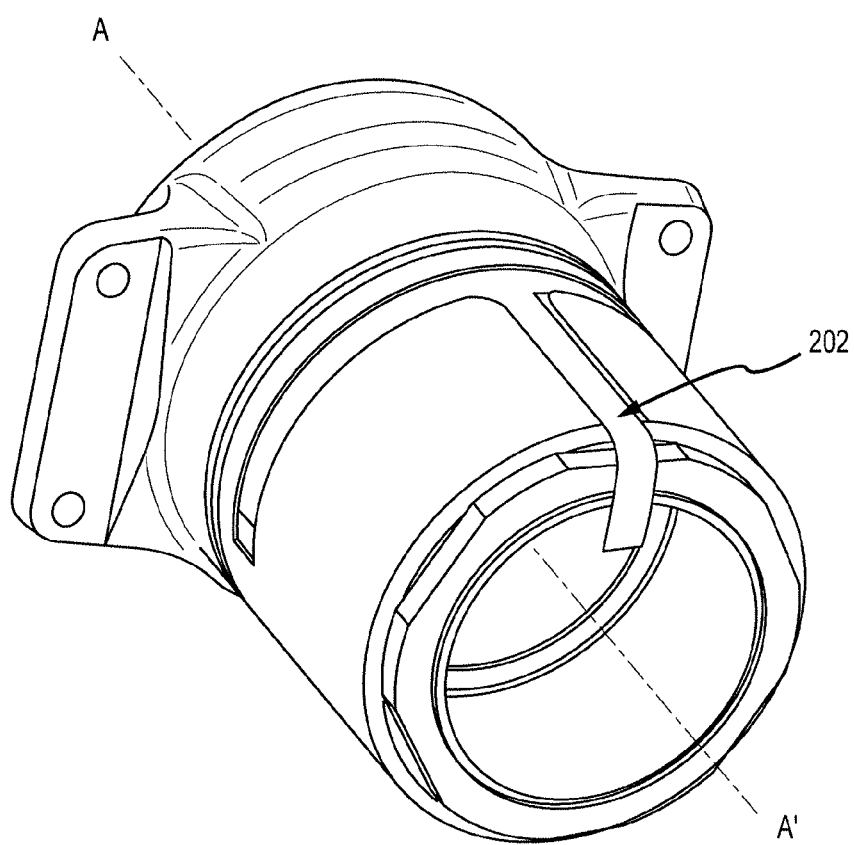
FIG. 2 illustrates, in accordance with various embodiments, a perspective view of an EMA housing coupled to a strain gauge.

As shown with reference to FIG. 2, the EMA housing 102 may be coupled to a strain gauge 202. The strain gauge 202 may measure a strain on the EMA housing 102. Strain may be measured as a radial and/or axial displacement of the EMA housing 102 relative to a radius perpendicular to axis A-A' and/or the longitudinal axis A-A' of the EMA housing 102 measured at a reference temperature. A controller may (as described herein) be coupled to the strain gauge 202, and the controller may adjust a force applied by the EMA 100 based upon a resistance of a variable resistance resistor (as described herein) coupled to and/or comprising a part of the strain gauge 202.

Thus, as the EMA housing 102 increases in temperature over the reference temperature, the strain gauge 202 may expand axially and/or radially, thereby registering a positive strain on the EMA housing 102. Likewise, as the EMA housing 102 decreases in temperature below the reference temperature, the strain gauge 202 may contract axially and/or radially, thereby registering a negative strain on the EMA housing 102. A positive strain may therefore comprise a strain measured as a result of expansion of the EMA housing 102, while a negative strain may comprise a strain measured as a result of contraction of the EMA housing 102.

Figure 3:
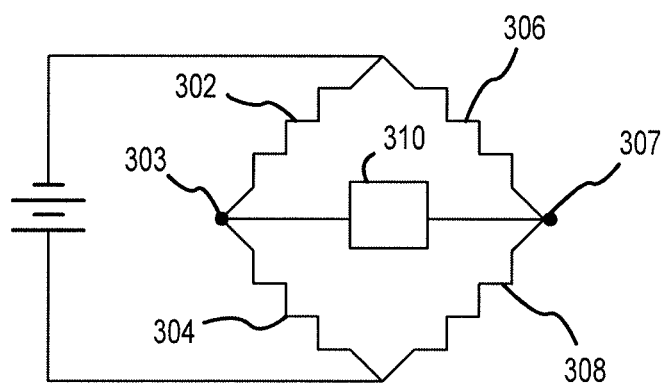
FIG. 3 illustrates a circuit diagram of a conventional Wheatstone bridge.

With attention to FIG. 3, a strain gauge 202 may include a circuit configured to measure a strain on a given structure, such as a strain on an EMA housing 102, by varying its resistance in response to a strain on the structure. For example, the circuit configured to measure a strain on a given structure may comprise a Wheatstone bridge 300, which are suitable for measuring the strain on a structure. The Wheatstone bridge 300 may, in general, comprise a first group of resistors comprising a first resistor 302 and a second resistor 304. The first group of resistors 302 and 304 may be coupled in series, and a first node 303 may be defined between the first resistor 302 and the second resistor 304.

The Wheatstone bridge 300 may further conventionally comprise a second group of resistors comprising a third resistor 306 and a fourth resistor such as a variable resistance resistor 308. The second group of resistors 306 and 308 may be coupled in series, and a second node 307 may be defined between the third resistor 306 and the fourth resistor, such as variable resistance resistor 308. The first group of resistors 302 and 304 may be coupled in parallel with the second group of resistors 306 and 308. One of the resistors, e.g., resistor 308, may comprise a variable resistance resistor (e.g., a potentiometer), while the remaining resistors 302, 304, and 306 may comprise resistors having known resistances. The resistance of the resistor 308 may vary, as described herein, in response to a strain thereon.

In operation, the node 303 may be coupled to the node 307 through an ammeter 310, such as a galvanometer (e.g., a current measuring device), and a current, if any, flowing between the nodes 303 and 307 may be measured. A current flowing between these nodes 303 and 307 indicates that the resistance of the first group of resistors 302 and 304 is unequal to the resistance of the second group of resistors 306 and 308. By measuring the current at the ammeter 310, the resistance of the variable resistance resistor 308 may be derived and the strain gauged. Alternatively, the current measured by the ammeter 310 may correlate to a particular strain.

The strain gauge 202 may be calibrated at a particular temperature (e.g., approximately room temperature, such as approximately 70 degrees Fahrenheit (21 degrees C.). This calibration may occur, for example, at the time the strain gauge 202 is affixed (e.g., via an epoxy or other adhesive) to the EMA housing 102. Calibration may entail measurement of the resistance of the variable resistance resistor 308 under a variety of loads applied by the EMA 100 to a brake stack. For example, the resistance of the variable resistance resistor 308 may be measured under a first strain gauge 202 load, a second load, a third load, etc. Each of these resistances may be tabulated and stored in a tangible, non-transitory memory (e.g., in tabular format), such that each resistance of the variable resistance resistor 308 corresponds, e.g., via a lookup table stored in the memory, to a particular EMA load applied to a brake stack. Thus, during operation, a load applied by an EMA 100 to a brake stack may be adjusted or controlled based on the measured resistance of the variable resistance resistor 308. In other words, during operation, a load applied to a brake stack may be varied as desired based upon a derived and/or measured resistance of the variable resistance resistor 308 reading. Stated another way, the Wheatstone bridge may be strain sensitive, in that the resistance thereof may vary with the load measured by the Wheatstone bridge.

In various embodiments, the variable resistance resistor 308 may simply comprise a known resistance (e.g., a non-variable resistance resistor). In this instance, a current passing through the ammeter 310 may be measured, similar to the process described above, under a variety of EMA loads to formulate a lookup table. In this manner, the load applied by the EMA 100 to a brake stack may be adjusted or controlled based upon a measurement of the current measured by the ammeter 310.

As described above, however, a strain gauge 202 may be calibrated at a particular temperature. That is, a resistance of the variable resistance resistor 308 (and/or a current measured by the ammeter 310) may be measured at a particular temperature for each of a plurality of EMA loads. As the temperatures of the EMA 100 and EMA housing 102 vary (e.g., as a result of heat generated by the operation of the EMA 100), the resistance of the variable resistance resistor 308 (and thus the current measured by the ammeter 310) may fluctuate, such that the resistances and/or currents tabulated at the strain gauge 202 installation temperature (e.g., 70 degrees Fahrenheit) inaccurately reflect the load applied by the EMA 100. In other words, as the temperatures of the EMA 100 and/or EMA housing 102 vary, the EMA 100 may apply inaccurate or incorrect loads to the brake stack.

To decrease or eliminate this error, many systems incorporate one or more temperature sensors within the EMA 100 and/or EMA housing 102. Specifically, EMA 100 load values are tabulated, as described above, for a variety of EMA 100 and/or EMA housing 102 temperatures, and the resistances of the variable resistance resistor 308 and/or the currents measured by the ammeter 310 under these loads may be measured and recorded. Accordingly, as the temperature of the EMA 100 and/or the EMA housing 102 vary, the resistance of the variable resistance resistor 308 and/or the current measured by the ammeter 310 may be also be measured. These values (the resistance of the resistor 308 and/or current measurement of the ammeter 310) may be referenced against a lookup table (or other tabulated data) to determine the load actually applied by the EMA 100 to a brake stack.

Figure 4:
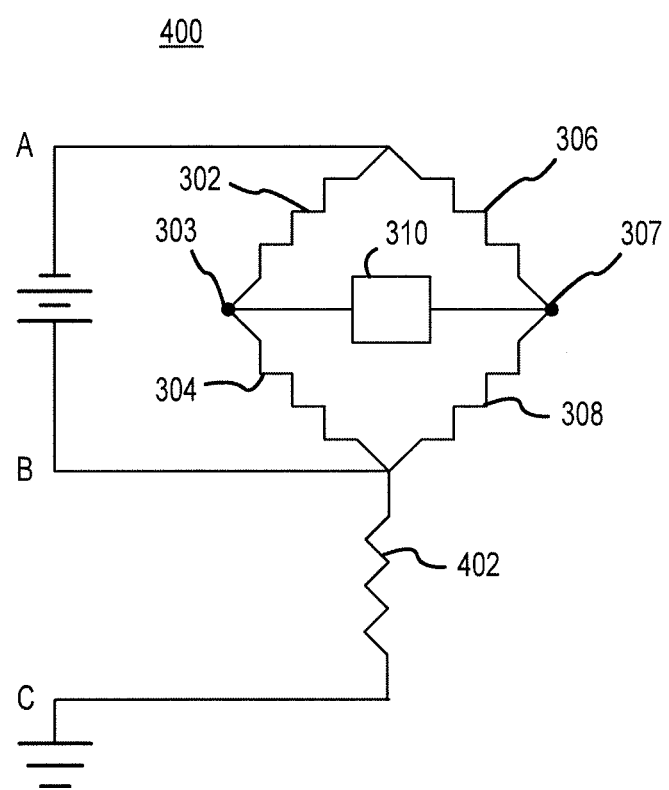
FIG. 4 illustrates, in accordance with various embodiments, a circuit diagram of an EMA strain gauge temperature compensation device.

Many conventional temperature sensors add weight, cost, and complexity to the strain gauge 202 and/or the overall EMA 100. Thus, a solution that eliminates a conventional temperature sensor is desirable. To this end, and with reference to FIG. 4, an exemplary strain gauge 400 comprising a variable resistance resistor 402 is shown. The strain gauge 400 may comprise a circuit capable of measuring strain on a structure. For example, strain gauge 400 may comprise Wheatstone bridge 300, as described above. However, rather than a conventional temperature sensor, a variable resistance resistor 402 may be coupled in series with the Wheatstone bridge 300. The resistance of the variable resistance resistor 402 may vary in known proportion to its temperature.

Accordingly, the resistance of the variable resistance resistor 402 may be measured (e.g., by the controller) during operation of the EMA 100, and, based upon the resistance of the variable resistance resistor 402, the temperature of the strain gauge 400 may be calculated. Specifically, a lookup table (or other tabulated data) may be stored in a tangible, non-transitory memory. This lookup table may correlate a variety of resistances of the variable resistance resistor 402 with a variety of temperatures of the variable resistance resistor 402 and/or loads applied at those temperatures and resistances. Thus, a temperature of the EMA 100 and/or EMA housing 102 may be measured based upon the measured resistance of the variable resistance resistor 402 (as the correlation between temperature and resistance of the variable resistance resistor 402 are known and tabulated). Having gauged the temperature of the EMA 100 and/or EMA housing 102, the load applied by the EMA 100 may be adjusted or compensated based upon the temperature.

Figure 5:
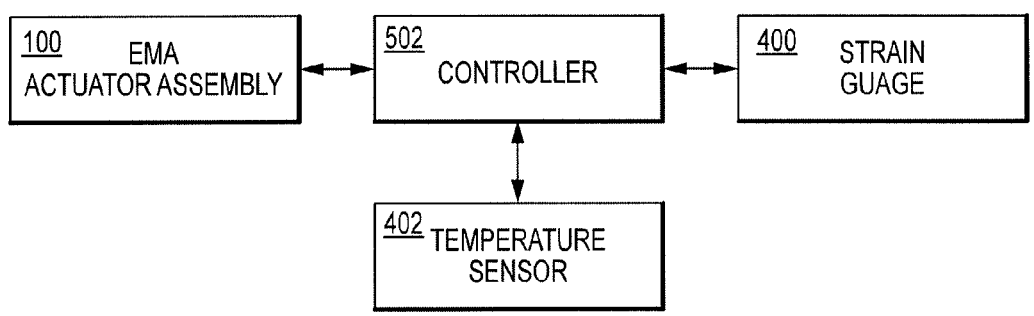
FIG. 5 illustrates, in accordance with various embodiments, a block diagram of a Wheatstone bridge coupled to a temperature compensation device.

Therefore, with brief reference to FIG. 5, a block diagram of an EMA strain gauge temperature compensation device 500 is shown. The device 500 may comprise an EMA 100, a controller 502, a strain gauge 400, and/or a temperature sensing, variable resistance resistor 402. As described herein, the controller 502 may be coupled to (or comprise an onboard) tangible, non-transitory memory, which may store one or more lookup tables, each table corresponding to a temperature (or temperature range). The controller 502 may further comprise a computer-based system and/or processor for temperature compensating a strain gauge. Each temperature (or range of temperatures) may further correspond to a resistance of the variable resistance resistor 308 and/or a current measured by the ammeter 310. Each temperature (or range of temperatures) may further correspond to a load applied by the EMA 100.

The controller may communicate with the memory to retrieve load and resistance and/or ammeter values based upon a temperature measured by the variable resistance resistor 402. The controller may further, depending upon the resistor 308 and/or ammeter 310 value retrieved from memory, adjust the load applied by the EMA 100 until the resistor 308 value and/or ammeter 310 value corresponds to the load and temperature values retrieved from the memory. Thus, the load applied by the EMA 100 may be adjusted based upon a temperature of the EMA 100 and/or EMA housing 102. In addition, no additional temperature sensing hardware is needed in the present system. Rather, all that is required is a typically inexpensive resistor 402. Thus, the system described herein may compensate a load applied by a strain gauge 400 (and/or 202) based upon a resistance of a temperature sensitive resistor 402.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator (EMA) comprising:
   an EMA housing;
   a strain gauge coupled to the EMA housing, the strain gauge comprising a Wheatstone bridge,
   the Wheatstone bridge comprising a first group of resistors coupled in parallel with a second group of resistors;
   a controller coupled to the strain gauge; and
   a variable resistance resistor coupled to the Wheatstone bridge, the variable resistance resistor configured to derive a temperature of the EMA housing based upon a resistance of the variable resistance resistor and configured to provide feedback to the controller,
   the controller adjusting a force applied by the EMA based upon the temperature of the EMA housing, wherein the controller is configured to measure a resistance of the variable resistance resistor to obtain a temperature of the EMA housing.

2. The EMA of claim 1, wherein the variable resistance resistor is coupled in series with the Wheatstone bridge.

3. The EMA of claim 1, wherein one resistor of the first group of resistors or the second group of the resistors in the Wheatstone bridge is strain sensitive, the resistance of the one resistor thereof varying with the load measured by the Wheatstone bridge.

4. The EMA of claim 1, wherein each resistor of the first group of resistors or the second group of the resistors in the Wheatstone bridge comprises a known resistance.

5. The EMA of claim 1, wherein the controller tabulates a plurality of loads based upon a plurality of temperatures measured by the variable resistance resistor.

6. The EMA of claim 5, wherein the controller tabulates a plurality of resistances based upon the plurality of temperatures measured by the variable resistance resistor.

7. The EMA of claim 6, wherein the controller adjusts the force applied by the EMA based upon each of a tabulated plurality of resistances.

8. An electromechanical actuator (EMA) comprising:
a strain gauge comprising a circuit for measuring a strain on an EMA housing; and
a controller coupled to the strain gauge:
    wherein the controller adjusts a force applied by the EMA based upon a resistance of a variable resistance resistor coupled in series to the circuit for measuring a strain on an EMA housing;
    wherein the circuit for measuring a strain on an EMA housing comprises a first group of resistors coupled in parallel with a second group of resistors;
    wherein each resistor of a first group of resistors and a second group of resistors are in a Wheatstone bridge and comprises a known resistance;
    wherein the controller determines a temperature of the EMA based upon the resistance of the variable resistance resistor.

9. The EMA of claim 8, wherein the circuit for measuring a strain on an EMA housing comprises a first group of resistors coupled in parallel with a second group of resistors.

10. The EMA of claim 8, wherein the controller adjusts a force applied by the EMA based upon the resistance of the variable resistance resistor.

11. The EMA of claim 8, wherein the resistance of the variable resistance resistor is affected by a temperature of the variable resistance resistor.

* * * * *